W. L. W. Chapman.
Propelling Machinery.
Nº 94,809. Patented Sept. 14, 1869.
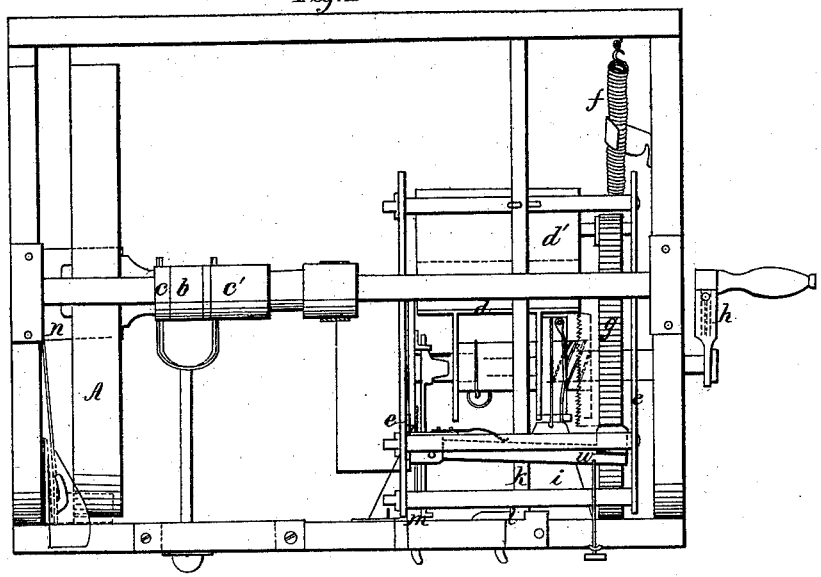
Fig. 1
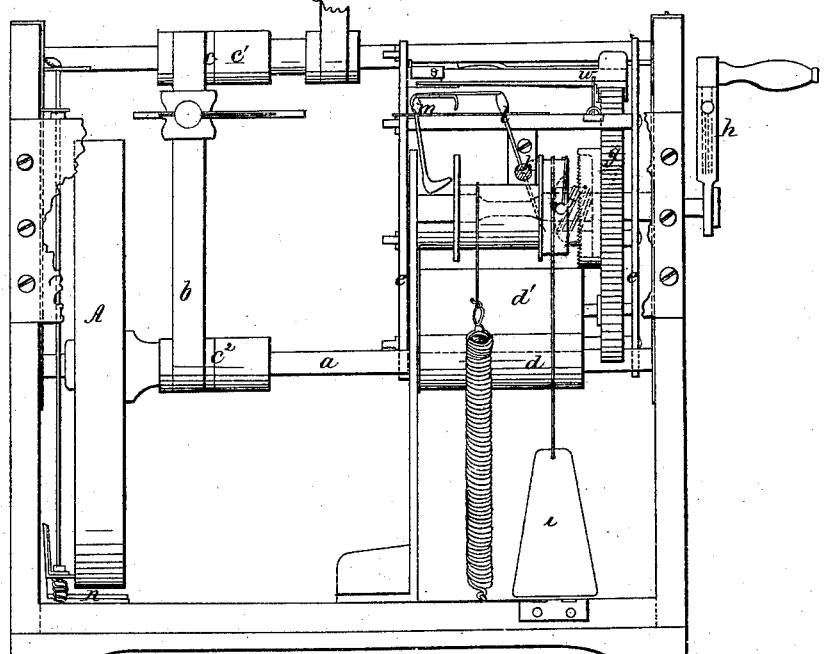
Fig. 2
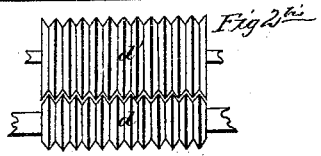
Fig. 2½
Witnesses
Bradford Jones
Samuel B. Jones
Inventor
Wm L. W. Chapman

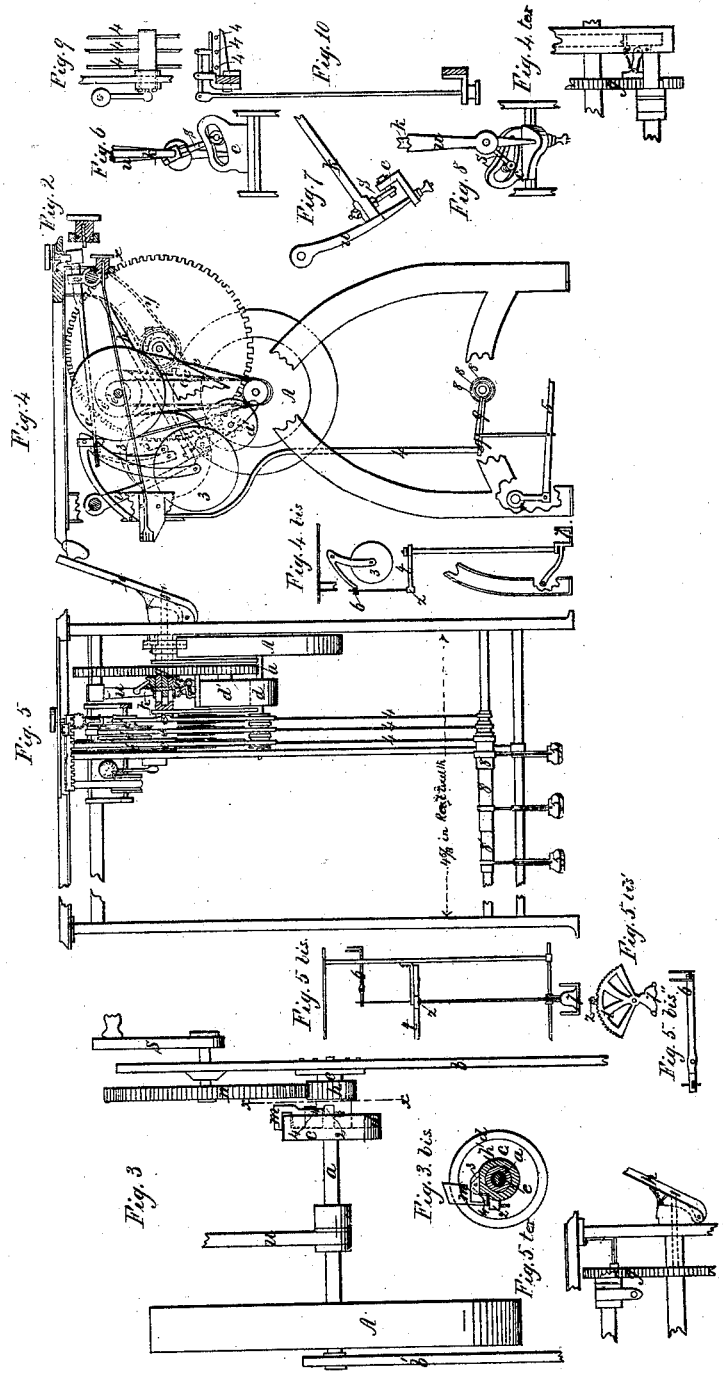

United States Patent Office.

WILLIAM Z. W. CHAPMAN, OF NEW YORK, N. Y.

Letters Patent No. 94,809, dated September 14, 1869.

---

IMPROVED APPARATUS FOR PROPELLING MACHINERY.

---

The Schedule referred to in these Letters Patent and making part of the same

---

*To all to whom these presents shall come:*

Be it known that I, WILLIAM Z. W. CHAPMAN, of the city, county, and State of New York, have invented certain new and useful Improvements in Apparatus for Propelling Machinery of a Light Character, which I denominate an Accelerated Motor; and I do hereby declare and ascertain my said improvements as follows, referring to the accompanying drawings, in which—

Figure 1 is a top view.
Figure 2 is a front elevation.
Figure 3 is a modification of the accelerating-apparatus.
Figure $3^{bis}$ is a section on line $x\,x$, fig. 3, showing interior of clutch.
Figure 4 is an end view.
Figure 5 is a front elevation of apparatus for regulating velocity, modified form.
Figures 6, 7, and 8 show parts of modified rock-shaft, as seen in fig. 5, at $c, s, k, u$.
Figures 9 and 10 exhibit device by which rods 4, in figs. 4 and 5, may be held in any position.
Figure 11 represents knob-fixture $x$, in fig. 4, enlarged.
Figures $4^{bis}$ and $5^{bis}$ show device to operate idler 3.

Various devices have been heretofore essayed for driving light machinery, such as weights, springs, cranks, and treadles, &c., but most of them have proved objectionable in some particular. Those driven by cranks and weights involved manual labor at a time when the whole attention should be directed to the working of the machine, and these, although probably the most direct, fatigue the operator, and are injurious to the health, while weights and such like motors are not compact, or require too much time and attention from the operator.

My newly-invented motor is to obviate these difficulties. The construction is as follows:

A is a heavy-rimmed fly-wheel, running on a shaft, $a$, and connected with a driving-shaft by a belt, $b$, over fast and loose pulleys $c\ c^1$, on the driving-shaft, and a fast pulley, $c^2$, on the motor-shaft, a common device, clearly shown in the drawing.

On the motor-shaft $a$ there is a drum, $d$, of sufficient length and diameter for the purpose, on which the accelerating-drum $d'$, about to be described, bears, to put the motor-wheel A in rapid motion, or accelerate its motion, when necessary, as required.

In the drawing, the drum $d'$ is suspended in a frame, $e\ e$, so as to be raised from or brought into contact with said drum $d$, and when at rest, it is kept out of contact with drum $d$, by the spring $f$, or other suitable device.

The drum $d'$ is driven by a spur-wheel, $g$, gearing into a pinion on the shaft of drum $d'$, the wheel $g$ being propelled by the crank $h$ or treadle $i$.

To connect and disconnect the drum $d'$ with drum $d$, I have devised several ways, one of which is illustrated in the drawing, where $k$ is a rock-shaft that bears drum $d'$ down on to drum $d$, by moving along the arm $l$ in front. When thus in contact, the crank $h$ is turned, by which the fly-wheel A is put in motion, and after getting up a proper velocity thereon, the drum $d'$ is thrown out of contact with drum $d$, and the fly-wheel is left free to drive the machinery by its momentum. As the speed of the fly-wheel slackens, the accelerator is again put into connection, and the velocity of the fly-wheel again accelerated.

The drums $d\ d'$ may be cylindrical, as seen in figs. 1, 2, or they may have V-grooves cut around them that gear into each other, as seen in detached Figure $2^{bis}$, to increase their surfaces of contact, if found desirable. If a treadle moved by the foot is used, instead of the crank, it may be connected or detached in a similar way with the motor. These may be done as shown in the drawing, by moving the parts into place, by means of independent levers or arms $l$ and $m$, worked by the hand or foot, or by automatic devices, such as forcing the crank $h$ inward, as shown in the modified device, fig. 5, before turning it, or otherwise, the purpose being to readily connect the accelerating-power with the driving-power, and when this is sufficiently accelerated, to instantly disconnect the parts, either by separating them or so detaching the connection as to allow the motor to run on rapidly, while the accelerator remains at rest, thus obtaining the full force of the acceleration on the working-point, without any retarding effect therefrom.

A brake, $n$, can be added, to stop the fly-wheel, also a clutch, $w$, to check back motion, and cone-pulleys, to regulate the speed, or a series of loose belts, $e$, (see figs. 4 and 5,) with different-sized pulleys $e'$, on the driving-shaft, and idler-pulleys 3, fig. 4, operated on by treadles 5, or otherwise, connected, by tubes 8, rods 4, and levers 9, with said idler, pulleys 3, to bring either of them into operation, or retire them, and thus start and stop, or vary the velocity of the machine, and a greater or less strain can be, by this means, brought upon the belts, to suit the purposes of the operator, in varying the speed of the machine driven.

A modified form of attaching and detaching the accelerator is represented in fig. 3 and fig. $3^{bis}$, in which A is the fly-wheel, $a$ its shaft, resting in bearings in standards $b\ b'$.

The clutch-wheel $c$ is fixed on the shaft $a$ with a rim, $d$, of equal thickness, and turned smooth.

Projecting from one face, $e$ is a hollow bearing, projecting from standard $b$, in which the journal of shaft $a$ turns, and on the outside of said hollow bearing the pinion-wheel $h$ revolves. The hub $h'$ of this pinion $h$ projects toward the clutch-wheel $c$.

$m$ is a clutch, that fits loosely the rim $d$, and gripes it when the inner end 4 is thrown outward from the shaft by the part 3. This end 4 rests loosely between projections 2 and 3 (see fig. 3$^{bis}$) from the hub $h'$.

The pinion $h$ gears into a spur-wheel, $n$, on the shaft of which there is a crank, $s$, by which it is driven.

When the pinion $h$ is turned faster than the fly-wheel, $m$ clutches the said rim $d$, and accelerates the momentum of the fly-wheel, but when the pinion $h$ moves slower than the fly-wheel, or is in a state of rest, the clutch is freed, and the fly-wheel moves independent of the accelerator.

A driving-belt is shown at $u$, to connect with working-machinery.

It is obvious that instead of pressing the drums $d$ $d'$ together, as in figs. 1, 2, a belt may be put around them and tightened, to drive them together, or loosened, to detach them, thus attaching and detaching the accelerator and fly-wheel, and any other sufficient and well-known device may be substituted for those herein named.

Having thus fully described my improvements,

What I claim as new, and for which I desire to secure Letters Patent, is—

The employment of an accelerator, substantially as herein described, with a fly-wheel, which drives the said fly-wheel, and from time to time accelerates its motion, as described, and when at rest, permits the said fly-wheel to continue its motion independent of and unretarded by said accelerator, substantially as and for the purposes set forth.

WM. Z. W. CHAPMAN.

Witnesses:
BRADFORD JONES,
SAMUEL B. JONES.